J. M. KELLER.
AIRSHIP.
APPLICATION FILED NOV. 13, 1905. RENEWED JUNE 11, 1910.
981,655.
Patented Jan. 17, 1911.
2 SHEETS—SHEET 1.
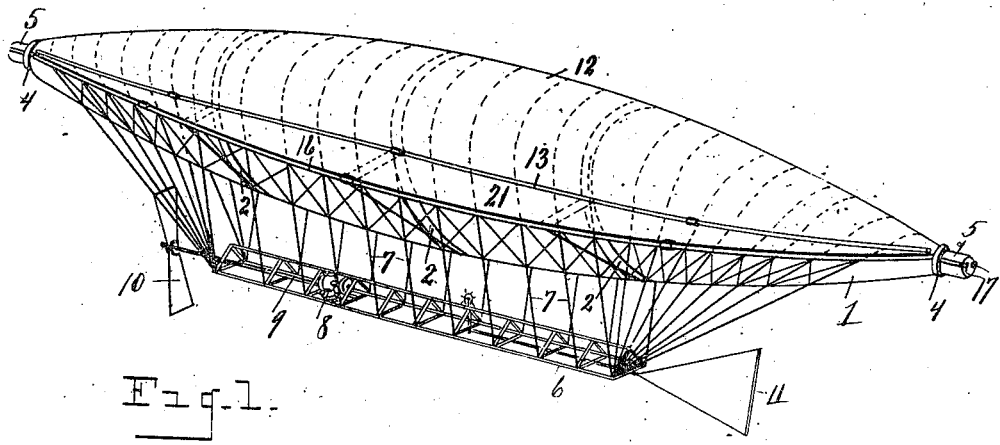
Fig. 1.
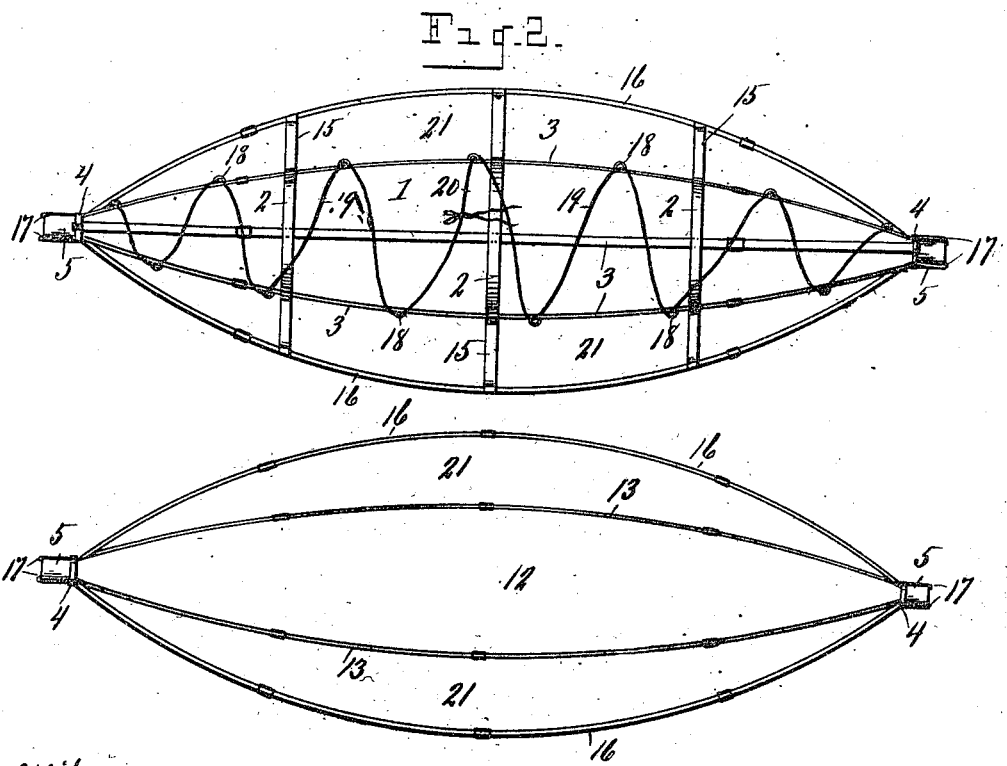
Fig. 2.
Fig. 3.
Witnesses
O. B. Baenziger,
I. G. Howlett.
Inventor
James M. Keller.
By E. S. Wheeler & Co. attys.

J. M. KELLER.
AIRSHIP.
APPLICATION FILED NOV. 13, 1905. RENEWED JUNE 11, 1910.
981,655.
Patented Jan. 17, 1911.
2 SHEETS—SHEET 2.
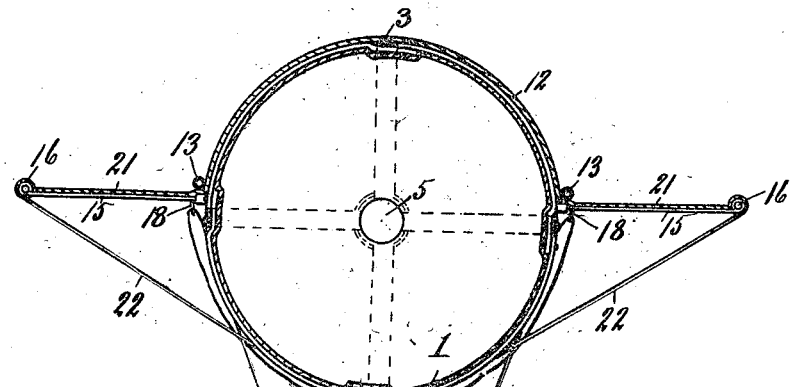
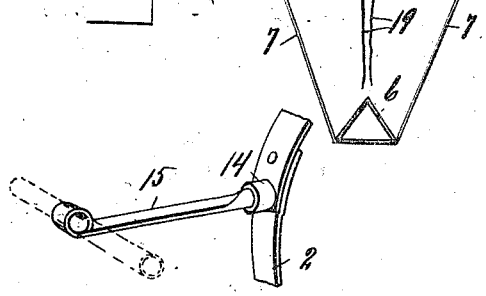
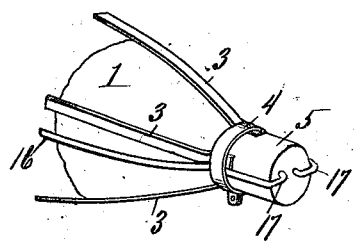
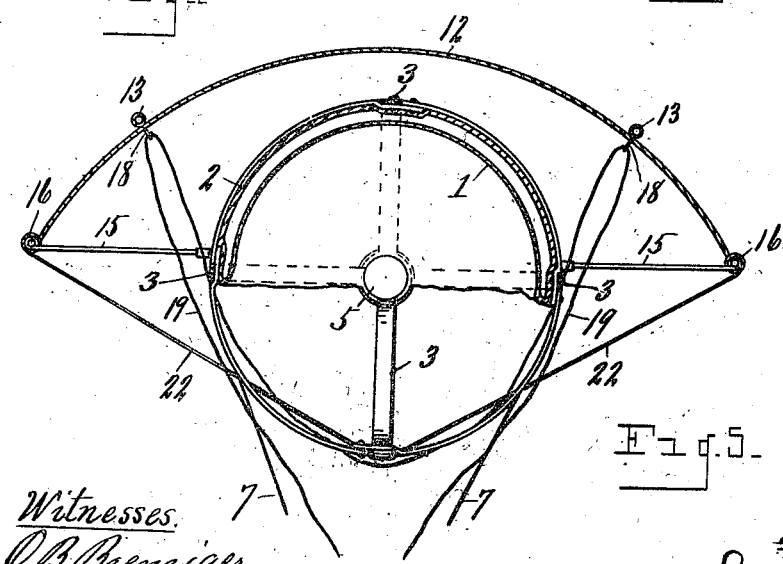
Witnesses
O. B. Buenziger,
J. G. Howlett.
Inventor,
James M. Keller.
By T. A. Wheeler & Co. atty.

UNITED STATES PATENT OFFICE.

JAMES M. KELLER, OF DETROIT, MICHIGAN, ASSIGNOR TO KELLER MONOPLANE AIRSHIP COMPANY, OF DALLAS, TEXAS, A CORPORATION OF ARIZONA TERRITORY.

AIRSHIP.

981,655.      Specification of Letters Patent.      Patented Jan. 17, 1911.

Application filed November 13, 1905, Serial No. 287,010. Renewed June 11, 1910. Serial No. 566,358.

*To all whom it may concern:*

Be it known that I, JAMES M. KELLER, a citizen of the United States, residing at Detroit, in the county of Wayne, State of Michigan, have invented certain new and useful Improvements in Airships; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to dirigible airships for aerial navigation, and consists in the construction and arrangement of parts hereinafter fully set forth and pointed out particularly in the claims.

The object of the invention is to provide the balloon or gas bag with aeroplanes which serve to steady the balloon during the flight of the ship, and to increase the lifting power of the balloon when the ship is under motion, the arrangement being such as to enable said aeroplanes to be converted into a parachute, should the balloon or gas bag become deflated, preventing the ship falling with such velocity as to rack the car and mechanism, and injure the aeronaut.

The above object is attained by the structure illustrated in the accompanying drawings, in which:—

Figure 1 is a perspective view of an airship embodying my invention. Fig. 2 is an inverted plan of the balloon and combined aeroplane and parachute attached thereto, showing the manner of normally holding the parachute in position so as to cause it to serve as an aeroplane. Fig. 3 is a plan view of Fig. 1. Fig. 4 is a transverse section through the balloon, showing the parachute when serving as an aeroplane. Fig. 5 is a similar section, showing the parachute expanded as when in service, and the gas bag or balloon collapsed. Fig. 6 is a fragmentary view in perspective of one of the lateral brace arms projecting from the balloon frame, employed to extend and support the aeroplanes upon the sides of the balloon. Fig. 7 is a fragmentary view in perspective of one end of the balloon frame, showing the manner of securing the longitudinal bars thereon.

Referring to the characters of reference, 1 designates the gas bag or balloon which is formed of any suitable material, and is preferably oblong in shape with tapered ends. Embracing the gas bag are the circular ribs 2 and connecting said ribs and extending longitudinally are the strengthening bars 3, whose opposite ends are secured under the collars 4, which embrace the cylindrical blocks 5 (see Fig. 7) at the ends of the balloon frame. The gas bag lies within the circular ribs 2 and bars 3.

The car 6 is made in any suitable shape, and formed of any suitable material, and is suspended from the balloon frame by means of a suitable netting 7 which embraces said frame and is attached to said car in a manner well understood in the art. The ship is propelled by suitable motor 8 mounted in the car and driving a shaft 9 upon the end of which is a propeller blade 10 located at the forward end of the car. The direction of the ship in its flight is controlled by a suitable rudder 11.

Embracing the upper portion of the balloon frame but detached therefrom, except at its ends, is a parachute covering 12. Extending longitudinally of the parachute covering and secured to the outer face thereof are the curved and flexible brace rods 13. Projecting laterally from the ribs 2 and mounted in sockets 14 attached to said ribs are the arms 15 which support at their outer ends the guard rails 16, which describe an elliptical figure, and whose end portions pass under the collars 4 and are secured to the end blocks 5, as shown at 17 in Fig. 7. The margins of the parachute covering are secured to the guard rails 16, whereby said marginal portions are held extended. Secured to the flexible brace rods 13 and depending from the under side of the parachute covering are the eyelets 18, through which pass the lacing cords 19, that cross diagonally under the balloon frame, and whose meeting ends are tied together, as at 20, and depend within reach of the operator, as shown in Fig. 4. When these lacing cords are drawn taut, the flexible brace rods 13 are drawn inwardly against the sides of the balloon frame so as to lie across the arms 15 at the junction of said arms with the ribs 2, as clearly shown in Figs. 1 and 4, causing the parachute covering to conform to the upper portion of the balloon frame and to extend inwardly from the guard rails 16 to the balloon frame, forming upon opposite sides of the gas bag, flat, diametrically extending wings 21, which serve as aeroplanes that give stability and directness to the flight of the ship, and also add to the lifting power of the balloon when the ship is driven ahead with the bow elevated, said aeroplanes also serving to prevent the rolling of the gas bag during the flight of the ship.

Should it be necessary to employ the parachute by reason of the collapsing of the gas bag or the escape of the gas therefrom, the depending ends of the lacing cords 19 are drawn upon to untie the knot 20, when the descent of the ship will cause the parachute to fill with air and expand it to the position shown in Fig. 5, in which position, because of its great area, it will prevent a rapid descent of the car, obviating serious injury thereto. In order to support the lateral arms 15 when the parachute is in service, guy ropes 22 are attached to the outer ends of said arms, and to the under portion of the frame.

The guard rails 16 not only serve as a means of securing the parachute covering, and of maintaining the aeroplanes, but said rails also serve to guard the gas bag from possible rupture, should the ship inadvertently encounter some object in its flight. The frame embracing the gas bag holds said bag at all times extended, and obviates the buckling thereof at its forward end when driven ahead with speed.

Having thus fully set forth my invention, what I claim as new and desire to secure by Letters Patent, is:—

1. In an air-ship, the combination with the inflatable bag of an embracing frame therefor, a car and the propulsive mechanism supported by said frame, of a parachute normally conforming to the contour of the inflatable bag and connected to said frame and with said car, means for confining the parachute in such position when not in service, and means for releasing the parachute to enable it to fill with air.

2. In an air-ship, the combination with the inflatable bag adapted to support a car, a frame-work surrounding said bag, a parachute connected to said frame-work, means for contracting the parachute around said frame-work and for extending the margins thereof to form aeroplanes, and means for releasing the parachute to allow it to fill.

3. In an air-ship, the combination with the inflatable bag, of a frame embracing said bag, a parachute, means for causing the body of the parachute to conform to said frame, means for extending the margins of the parachute to form aeroplanes on opposite sides of the inflatable bag, and extending longitudinally thereof, and means for releasing the body of the parachute to enable it to fill.

4. In an air-ship, the combination with the inflatable bag, of a frame embracing said bag, said frame consisting of circular ribs and longitudinally extending strengthening bars connecting said ribs, continuous outer guard rails supported from the ribs of the frame and extending longitudinally thereof from end to end on opposite sides, a filling between the guard rails and the frame, said filling extending over and embracing the gas bag and means for confining said filling at the juncture of the frame and bag to form aeroplanes on opposite sides.

5. In an air-ship, the combination with the inflatable bag oblong in shape, of a frame embracing said bag having outer projecting guards, a parachute attached at its margins to the outer guards of said frame, flexible brace rods running longitudinally of said parachute, means for drawing said rods inwardly against the frame of the gas bag to cause the body of the parachute to conform to said frame and the margins to extend laterally to form aeroplanes, and means for releasing the body of the parachute to enable it to fill.

In testimony whereof, I sign this specification in the presence of two witnesses.

JAMES M. KELLER.

Witnesses:
E. S. WHEELER,
I. G. HOWLETT.